(12) United States Patent
Liang et al.

(10) Patent No.: US 12,499,179 B2
(45) Date of Patent: Dec. 16, 2025

(54) SELECTION METHOD OF LEARNING DATA AND COMPUTER SYSTEM

(71) Applicant: Hitachi Solutions, Ltd., Tokyo (JP)

(72) Inventors: Yuxin Liang, Tokyo (JP); Masashi Egi, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 938 days.

(21) Appl. No.: 17/675,445

(22) Filed: Feb. 18, 2022

(65) Prior Publication Data
US 2023/0019364 A1 Jan. 19, 2023

(30) Foreign Application Priority Data
Jul. 15, 2021 (JP) ................................ 2021-117000

(51) Int. Cl.
*G06F 18/21* (2023.01)
*G06F 3/0482* (2013.01)
*G06F 18/214* (2023.01)

(52) U.S. Cl.
CPC ........ *G06F 18/2185* (2023.01); *G06F 3/0482* (2013.01); *G06F 18/214* (2023.01)

(58) Field of Classification Search
CPC ... G06F 18/2185; G06F 18/214; G06F 3/0482
See application file for complete search history.

(56) References Cited

U.S. PATENT DOCUMENTS

| | | | |
|---|---|---|---|
| 2019/0050723 A1* | 2/2019 | Kong | ................. G06N 3/08 |
| 2020/0097847 A1* | 3/2020 | Convertino | .............. G06N 7/01 |
| 2022/0083859 A1* | 3/2022 | Okamoto | ............... G06N 20/10 |

FOREIGN PATENT DOCUMENTS

| | | | | |
|---|---|---|---|---|
| JP | 2020030738 A | * | 2/2020 | |
| WO | WO-2020062250 A1 | * | 4/2020 | ............... G06N 3/08 |
| WO | 2020194500 A1 | | 10/2020 | |

OTHER PUBLICATIONS

Koh et al.,"Understanding Black-box Predictions via Influence Functions" arXiv preprint arXiv:1703.04730 (2017) 12 pgs.

* cited by examiner

*Primary Examiner* — Shahid K Khan
(74) *Attorney, Agent, or Firm* — Volpe Koenig

(57) ABSTRACT

A computer system accurately selects learning data for improving a prediction accuracy of a predictor, and is connected to a database that stores a plurality of pieces of learning data and information for managing a plurality of predictors generated under different learning conditions. A target predictor is selected, an influence degree representing strength of an influence of the learning data on a prediction accuracy of the target predictor for test data is calculated for each of a plurality of pieces of test data, an influence score of the learning data is calculated for the plurality of predictors based on a plurality of influence degrees of the learning data associated with the predictors, and the learning data to be used is selected from the plurality of pieces of learning data on the basis of a plurality of the influence scores of each of the plurality of pieces of learning data.

9 Claims, 13 Drawing Sheets

| LEARNING CONDITION ID | LEARNING ORDER | | | HYPERPARAMETER | LEARNING RESULT | | | |
|---|---|---|---|---|---|---|---|---|
| 301 | 302 | | | 303 | 304 | | | |
| | BATCH_1 | ... | BATCH_I | LEARNING RATE | ... | RESULT_1 | ... | RESULT_I |
| P_1 | L_1,L_2,... | ... | L_10,L_13,... | 0.1 | ... | [0.001, 2.2, ...]; 89.1% | ... | [0.001, 2.2, ...]; 99.1% |
| P_2 | L_21,L_23,... | ... | L_1,L_3,... | 0.1 | ... | [0.01, 21, ...]; 88.8% | ... | [0.011, 12, ...]; 99.2% |
| ... | ... | ... | ... | ... | ... | ... | ... | ... |
| P_K | L_1,L_5,... | ... | L_21,L_22,... | 0.001 | ... | [0.1, 2.11, ...]; 90.2% | ... | [0.11, 2.2, ...]; 99.3% |

| | T_1 | T_2 | ... | T_N |
|---|---|---|---|---|
| L_1 | 1 | -7 | ... | -1 |
| L_2 | 3 | -6 | ... | -4 |
| ⋮ | ... | ... | ... | ... |
| L_M | 1 | 3 | ... | -9 |

400

| LEARNING DATA ID | INFLUENCE DEGREE | | | | INFLUENCE SCORE |
|---|---|---|---|---|---|
| | P_1 | P_2 | ... | P_N | |
| L_1 | 13 | 13 | ... | 13 | 13 |
| L_2 | -5 | -5 | ... | -5 | -5 |
| ⋮ | ⋮ | ⋮ | ⋮ | ... | ⋮ | ⋮ |
| L_M | 6 | 6 | ... | 6 | 6 |

```
                                                        700
call_calc  --traindata ./traindata.csv
           --testdata . /testdata.csv
           --trainpattern Omax
           --batchsize K
           --learningrate "0.1-0.001"
           --learningrateDB 0.1
           --output "ALL"
```

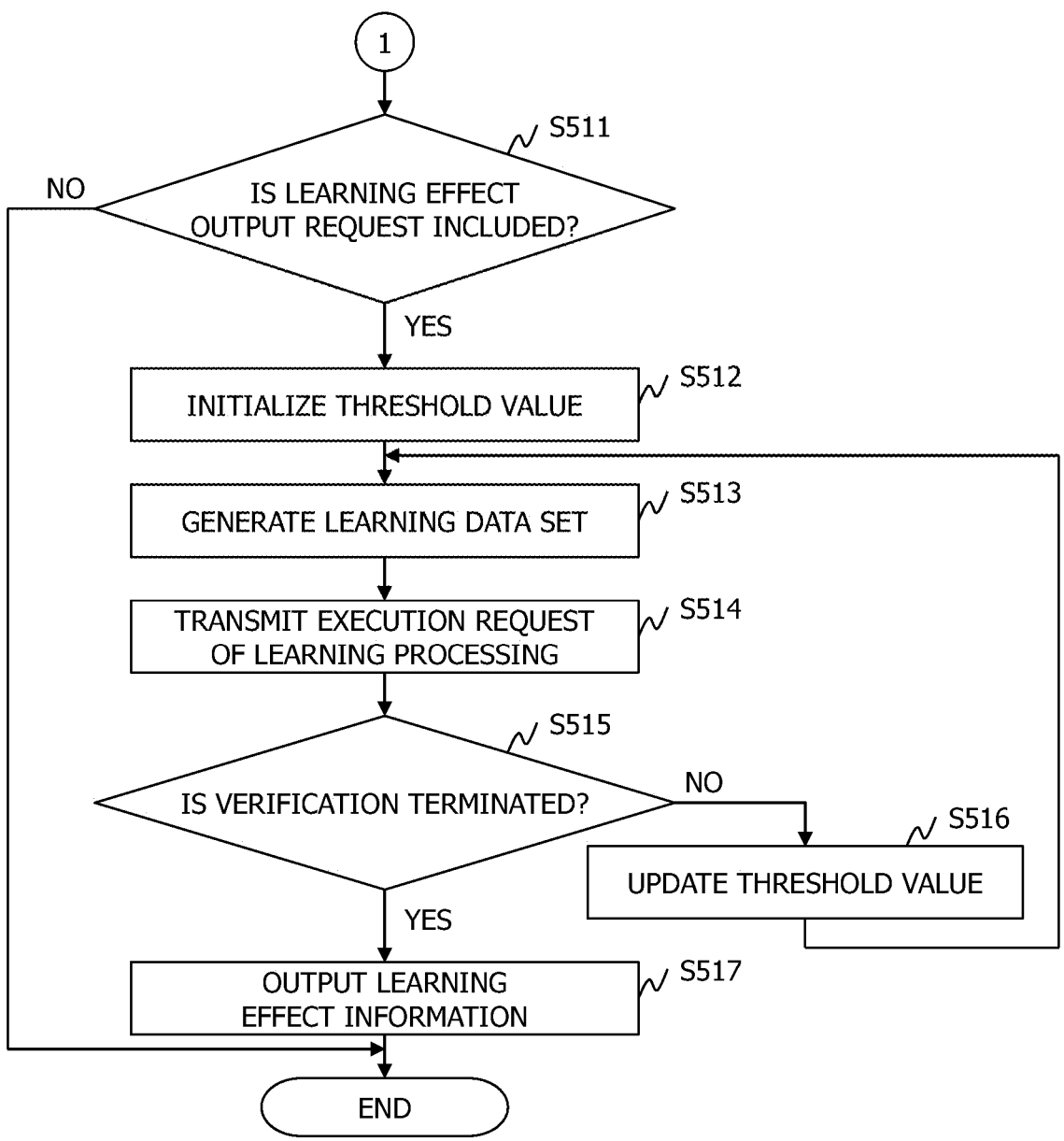

FIG.13

OUTPUT SCREEN — 1300

400

|  | T_2 | T_5 | ... | T_51 | T_1 |
|---|---|---|---|---|---|
| L_1 | 10 | 11 | ... | -10 | -12 |
| L_8 | 9.9 | 9.8 | ... | -9 | -11 |
| ⋮ | ... | ... | ... | ... | ... |
| L_20 | 0 | 0 | ... | 29 | 31 |
| L_300 | 0.1 | 0.2 | ... | 33 | 30 |

133

| LEARNING DATA ID | INFLUENCE DEGREE | | | | INFLUENCE SCORE |
|---|---|---|---|---|---|
| | P_1 | P_2 | ... | P_N | |
| L_1 | 13 | 13 | ... | 13 | 13 |
| L_2 | -5 | -5 | ... | -5 | -5 |
| ⋮ | ⋮ | ⋮ | ⋮ | ⋮ | ⋮ |
| L_M | 6 | 6 | ... | 6 | 6 |

501  502  503

SELECTION METHOD OF LEARNING DATA AND COMPUTER SYSTEM

CLAIM OF PRIORITY

The present application claims priority from Japanese patent application JP 2021-117000 filed on Jul. 15, 2021, the content of which is hereby incorporated by reference into this application.

BACKGROUND OF THE INVENTION

1. Field of the Invention

The present invention relates to a selection method of learning data to be used in machine learning.

2. Description of the Related Art

In recent years, various services utilizing artificial intelligence (AI) have been provided. As a method of generating a model for realizing AI that predicts any event, a method using machine learning has been known. As one of algorithms of machine learning, there is supervised learning. The supervised learning is learning using learning data including inputs and correct answer labels.

In a case where a model is generated by using the supervised learning, by using high-quality learning data, prediction accuracy can be improved as a problem of model's overfit can be suppressed. Here, the high-quality learning data represents learning data having a high effect of improving the prediction accuracy of the model. In addition, in order to tune a model adapted to a specific situation or use, it is necessary to perform learning by using learning data in which a situation or use is considered.

Thus, it is important to appropriately select the learning data to be used in the supervised learning. The technique described in JP-2020-030738-A referred to as Patent Document 1 hereinafter has been known for the problem.

Patent Document 1 recites "in an analysis method of learning data executed by a computer system for analyzing learning data used for constructing a predictor, the computer system includes a computer, and the computer is connected to a database for storing a plurality of pieces of learning data and includes a step of selecting target learning data from the database, a step of calculating an influence degree representing the strength of the influence of the target learning data on the prediction accuracy of the predictor for a plurality of pieces of test data, and a step of selecting learning data to be included in a learning data set to be input for constructing the predictor from the plurality of pieces of learning data on the basis of the influence degree of each of the plurality pieces of learning data."

SUMMARY OF THE INVENTION

If learning conditions such as an order to feed learning data set and a hyperparameter are different, the behavior of a predictor for input data becomes different. In the technique described in Patent Document 1, since a predictor learned under a freely selected learning condition is used, there is a possibility that an influence degree depends on the characteristics (learning conditions) of the predictor. Thus, even if the influence degree is analyzed, there is a possibility that the prediction accuracy is not improved.

The present invention has been made in view of the foregoing problems. That is, the present invention realizes a method and a system for selecting learning data contributing to improvement in the prediction accuracy of predicting a target event by using an index independent on a predictor generated under a specific learning condition.

The following is a representative example of the invention disclosed in the application. That is, the present invention provides a selection method of learning data used for generating a predictor executed by a computer system, the computer system including a computer having a processor and a memory connected to the processor and being connected to a database that stores a plurality of pieces of learning data and information for managing a plurality of predictors generated under different learning conditions, and the selection method of learning data including a first step in which the computer selects a target predictor from the plurality of predictors and calculates, for each of a plurality of pieces of test data, an influence degree representing strength of an influence of the learning data on a prediction accuracy of the target predictor for the test data, a second step in which the computer records the predictor and the influence degree of the learning data for each of the plurality of pieces of test data in association with each other, a third step in which the computer calculates an influence degree of the learning data for each of the plurality of predictors on the basis of a plurality of the influence degrees of the learning data associated with the predictors, a fourth step in which the computer records each of the plurality of predictors and the influence degree of the learning data in association with each other, and a fifth step in which the computer generates a learning data set by selecting the learning data to be used from the plurality of pieces of learning data on the basis of a plurality of the influence degrees of each of the plurality of pieces of learning data.

According to one aspect of the present invention, it is possible to select learning data contributing to improvement in prediction accuracy. Problems, configurations, and effects other than those described above will be clarified by the following description of the embodiment.

BRIEF DESCRIPTION OF THE DRAWINGS

FIG. 3 is a diagram depicting an example of a data structure of learning history information of the first embodiment;

FIG. 7 is a diagram depicting an example of a UI provided by the data acceptance unit of the first embodiment;

FIG. 12B is a flowchart describing the output information generation processing executed by the computer of the first embodiment;

FIG. 13 is a diagram depicting an example of information output by the computer of the first embodiment.

DESCRIPTION OF THE PREFERRED EMBODIMENTS

Figure 1:
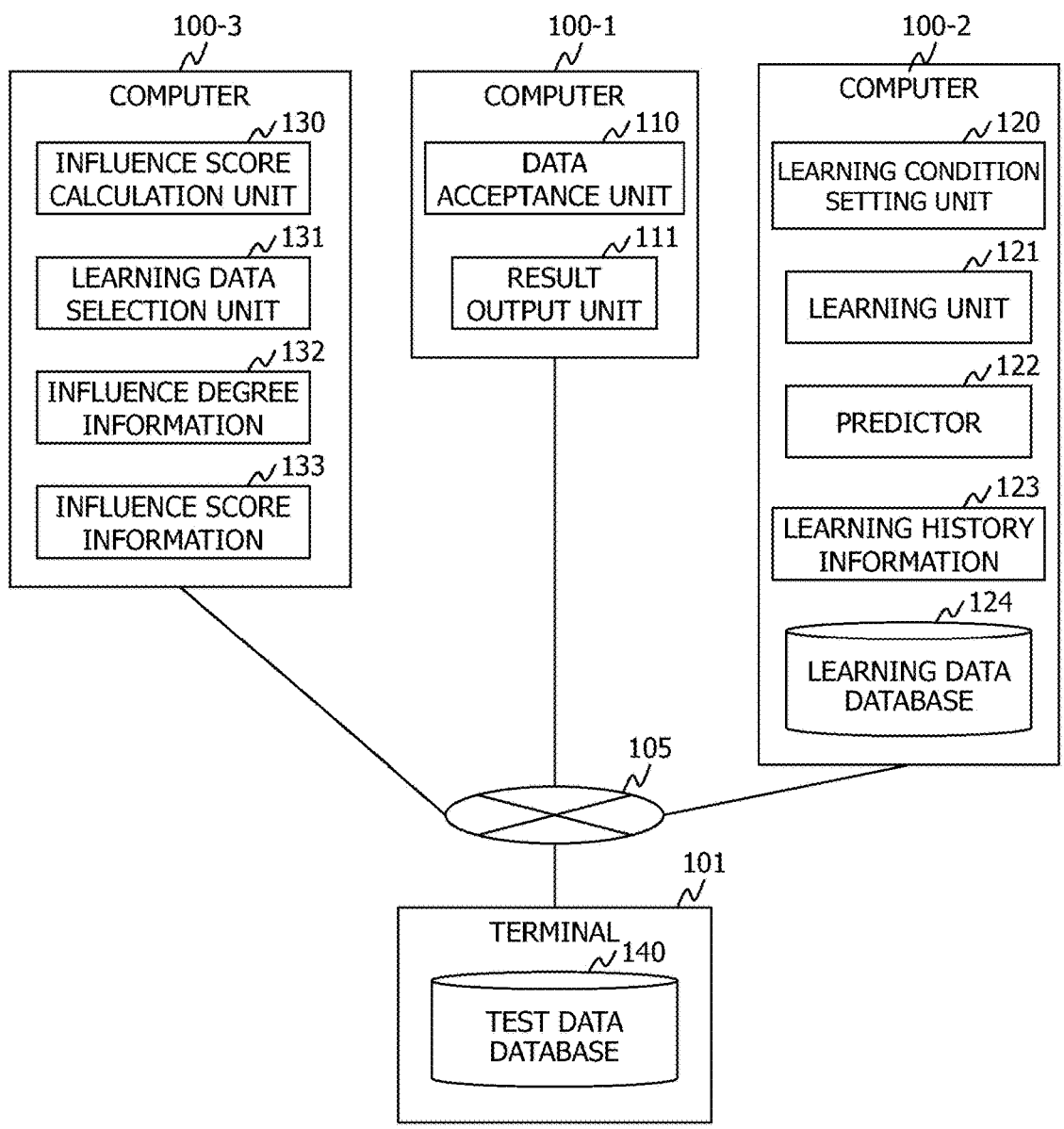
FIG. 1 is a diagram depicting an example of a configuration of a computer system of a first embodiment.

Hereinafter, an embodiment of the present invention will be described with reference to the drawings. However, the present invention is not interpreted by being limited to the content described in the embodiment indicated below. It will be readily understood by those skilled in the art that the specific configuration can be changed without departing from the idea or spirit of the present invention.

In the configuration of the invention to be described below, the same or similar configurations or functions will be denoted by the same reference signs, and the duplicated explanation thereof will be omitted.

The expressions "first," "second," "third," and the like in the present specification and the like are added to identify constitutional elements and do not necessarily limit numbers or orders.

The position, size, shape, range, and the like of each configuration presented in the drawings and the like do not represent the actual position, size, shape, range, and the like in some cases in order to easily understand the invention. Thus, the present invention is not limited to the position, size, shape, range, and the like disclosed in the drawings and the like.

First Embodiment

FIG. 1 is a diagram depicting an example of a configuration of a computer system of a first embodiment.

The computer system includes computers 100-1, 100-2, and 100-3, and a terminal 101. The computers 100-1, 100-2, and 100-3, and the terminal 101 are connected to each other via a network 105 such as a wide area network (WAN) and a local area network (LAN). The connection method of the network 105 may be either wired or wireless.

In the following description, in a case where the computers 100-1, 100-2, and 100-3 are not distinguished from each other, each computer is described as a computer 100.

The terminal 101 is a computer operated by a user, and has a processor, a main storage device, a sub-storage device, a network interface, an input device, and an output device that are not depicted in the drawing. The terminal 101 manages a test data database 140. The test data database 140 stores test data for verifying the prediction accuracy of a predictor 122. The test data includes using feature quantities of a plurality of items.

In the present specification, a plurality of pieces of test data used for verification of the prediction accuracy is described as a test data set.

It should be noted that it is not necessary for the terminal 101 to manage the test data database 140. In this case, some or all pieces of learning data stored in a learning data database 124 are treated as test data.

The computer 100-1 is a computer that provides a user interface (UI) for accepting an operation from the terminal 101. The computer 100-1 has a data acceptance unit 110 and a result output unit 111.

The data acceptance unit 110 accepts an input from the terminal 101 through the UI. The result output unit 111 outputs the result of processing executed by the computers 100-2 and 100-3 via the UI.

The computer 100-2 executes learning processing for generating a model (predictor 122), and predicts any event by use of the model. The computer 100-2 has a learning condition setting unit 120, a learning unit 121, and the predictor 122, and manages learning history information 123 and the learning data database 124.

The predictor 122 predicts any event by use of input data. The learning condition setting unit 120 sets learning conditions in learning processing for generating the predictor 122. Here, the learning condition is a concept including (1) a plurality of pieces of learning data used for learning processing and an input order (learning order) of the plurality of pieces of learning data and (2) a hyperparameter. It is assumed that the learning conditions of the present embodiment include at least the plurality of pieces of learning data used for learning processing and the input order of the plurality of pieces of learning data. The learning unit 121 executes learning processing.

The learning history information 123 is information for managing a learning history including the learning conditions and learning results. The data structure of the learning history information 123 will be described with reference to FIG. 3. The learning data database 124 stores learning data used for the learning processing. The learning data includes feature quantities of a plurality of items and correct answer labels.

In the present specification, a plurality of pieces of learning data used for the learning processing is described as a learning data set. As will be described later, learning data to be included in the learning data set is selected from the learning data stored in the learning data database 124.

The computer 100-3 selects the learning data to be used for generating the predictor 122. Here, "generation of the predictor 122" is a concept including generation of a new predictor 122 and regeneration of the predictor 122 by relearning. The computer 100-3 has an influence score calculation unit 130 and a learning data selection unit 131, and manages influence degree information 132 and influence score information 133.

The influence score calculation unit 130 calculates an influence score representing the strength of the influence of the learning data on the prediction accuracy of the predictor 122 for the test data set. The influence score of the present embodiment is calculated by using an influence degree representing the strength of the influence of the learning data on the prediction accuracy of the predictor 122 in a case where a prediction is made for any test data. The influence degree can be calculated by use of the calculation method described in "Pang Wei Koh and Percy Liang's "Understanding Black-box Predictions via Influence Functions," in arXiv preprint arXiv: 1703.04730 (2017) which is referred to as Non-Patent Document 1 hereinafter." It should be noted that the present embodiment is not limited to the calculation method of the influence score and the influence degree.

Here, the calculation method of the influence degree described in Non-Patent Document 1 will be described. The influence score calculation unit 130 uses a plurality of pieces of learning data, test data, and the predictor 122 to calculate a value indicating a fluctuation tendency of a parameter of the predictor 122 in a case where the learning data to be evaluated is included in the learning data set and to calculate a value indicating a fluctuation tendency of a prediction result for any test data in a case where the parameter of the predictor 122 is allowed to fluctuate. The influence score calculation unit 130 calculates the influence degree by use of the two values. The influence score calculation unit 130 calculates the influence degrees the number of which corresponds to that of test data for one learning data to be evaluated. A positive influence degree indicates that the prediction accuracy of the predictor 122 is improved, and a negative influence degree indicates that the prediction accuracy of the predictor 122 is lowered.

The influence score calculated by use of the influence degree represents the strength of the influence of the learning data on the prediction accuracy of the predictor 122 in the prediction for a test data group.

The learning data selection unit 131 selects the learning data to be included in the learning data set on the basis of the influence score of the learning data.

The influence degree information 132 is information for managing the influence degree of the learning data. The data structure of the influence degree information 132 will be described with reference to FIG. 4A and FIG. 4B. The influence score information 133 is information for managing the influence score of the learning data. The data structure of the influence score information 133 will be described with reference to FIG. 5.

Figure 2:
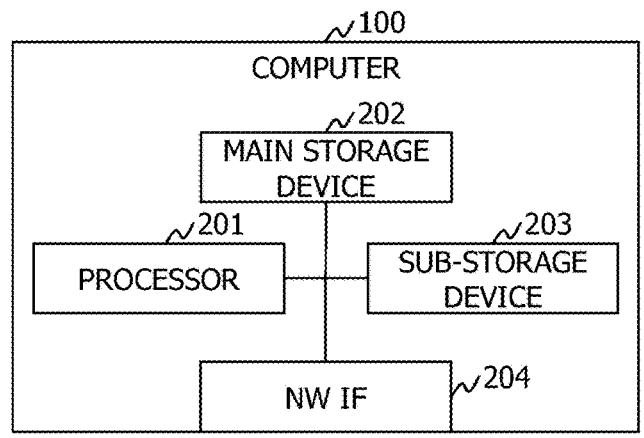
FIG. 2 is a diagram depicting an example of a hardware configuration of a computer of the first embodiment.

Here, a hardware configuration of the computer 100 will be described. FIG. 2 is a diagram depicting an example of a hardware configuration of the computer 100 of the first embodiment.

The computer 100 has a processor 201, a main storage device 202, a sub-storage device 203, and a network interface 204. The hardware configurations are connected to each other via an internal bus. It should be noted that it is not necessary for the computer 100 to have the sub-storage device 203. In addition, the computer 100 may have an input device and an output device.

The processor 201 executes a program stored in the main storage device 202. The processor 201 executes processing according to a program to operate as a functional unit (module) for realizing a specific function such as the influence score calculation unit 130. In the following description, in a case where processing is described by use of a functional unit as the subject, it indicates that the processor 201 executes a program for realizing the functional unit.

The main storage device 202 stores a program executed by the processor 201 and information used by the program. In addition, the main storage device 202 includes a work area temporarily used by a program.

The main storage device 202 of the computer 100-1 stores programs for realizing the data acceptance unit 110 and the result output unit 111. The main storage device 202 of the computer 100-2 stores programs for realizing the learning condition setting unit 120, the learning unit 121, and the predictor 122. It should be noted that the value of the parameter defining the predictor 122 is stored in the learning history information 123. The main storage device 202 of the computer 100-3 stores programs for realizing the influence score calculation unit 130 and the learning data selection unit 131.

The sub-storage device 203 is a hard disk drive (HDD), a solid state drive (SSD), or the like, and permanently stores data.

The sub-storage device 203 of the computer 100-2 stores the learning history information 123 and the learning data database 124. It should be noted that the learning data database 124 may be stored in a storage system accessible by the computer 100-2. The sub-storage device 203 of the computer 100-3 stores the influence degree information 132 and the influence score information 133.

It should be noted that a plurality of functional units provided in each computer 100 may be integrated into one functional unit, or one functional unit may be divided into a plurality of functional units for each function. In addition, the functional units provided in each computer 100 may be integrated into one computer 100.

FIG. 3 is a diagram depicting an example of a data structure of the learning history information 123 of the first embodiment.

The learning history information 123 is data in a table format and stores an entry including a learning condition identification (ID) 301, a learning order 302, a hyperparameter 303, and a learning result 304. There is one entry for one learning condition. It should be noted that the fields included in the entry are not limited to those described above. It is not necessary to include any of the above-described fields, or other fields may be included.

The learning condition ID 301 is a field for storing identification information of the learning condition. It is assumed that the identification information of the learning condition of the present embodiment is a combination of a symbol "P" and an identification number. In addition, it is assumed that the identification information of the learning data is a combination of a symbol "L" and an identification number, and the identification information of the test data is a combination of a symbol "T" and an identification number.

The learning order 302 is a field group for storing information relating to the learning data included in the learning data set and the input order of the learning data. In the present embodiment, learning processing is executed to generate a plurality of subsets (batches) from a plurality of pieces of learning data stored in the learning data database 124 and to update the parameter defining the predictor 122 for each batch. The learning order 302 includes fields the number of which corresponds to that of batches. One field stores the identification information of the learning data arranged in the input order.

The hyperparameter 303 is a field group for storing hyperparameters used in the learning processing. The hyperparameter 303 includes fields for storing a learning rate, the number of epochs, and the like.

The learning result 304 is a field group for storing the result of the learning processing. The learning result 304 includes fields the number of which corresponds to that of batches. One field stores the value of the parameter defining the predictor 122 and the prediction accuracy as the learning result.

Figures 4A, 4B, 5:
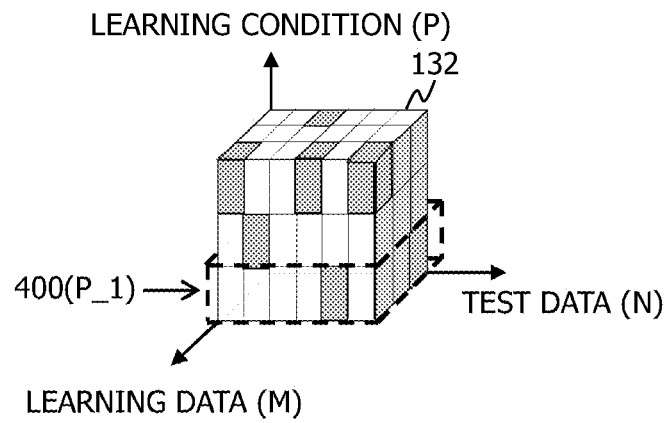
FIG. 4A is a diagram depicting an example of a data structure of influence degree information of the first embodiment.
FIG. 4B is a diagram depicting an example of a data structure of the influence degree information of the first embodiment.
FIG. 5 is a diagram depicting an example of a data structure of influence score information of the first embodiment.

FIG. 4A and FIG. 4B are diagrams each depicting an example of a data structure of the influence degree information 132 of the first embodiment.

FIG. 4A is a diagram depicting an image of a data structure of the influence degree information 132. The influence degree information 132 is data of a three-dimensional array in which the learning data, test data, and learning conditions are used as indices.

FIG. 4B depicts a two-dimensional array 400 in which the learning condition ID 301 is "P_1."

L_i represents the identification information of the learning data in the i-th row, and T_h represents the identification information of the test data in the h-th column. The influence degree is stored in the cell. For example, the cell of the i-th row and the h-th column stores the influence degree representing the strength of the influence of the learning data (L_i) on the prediction accuracy of the predictor 122 in a case where a prediction is made for the test data (T_h). One row can be treated as a vector whose component is the influence degree of one learning data. In the following description, a vector whose component is the influence degree is described as an influence degree vector of learning data.

Thus, the influence degree information 132 is information for managing an influence degree matrix (two-dimensional array 400) generated by enumerating the influence degree vectors for each learning condition.

FIG. 5 is a diagram depicting an example of a data structure of the influence score information 133 of the first embodiment.

The influence score information 133 includes a plurality of entries including a learning data ID 501, an influence degree 502, and an influence score 503. There is one entry for one learning data. It should be noted that the fields included in the entry are not limited to those described above. It is not necessary to include any of the above-described fields, or other fields may be included.

The learning data ID 501 is a field for storing identification information of the learning data. The influence degree 502 is a field group for storing the influence score of the learning data. The influence degree 502 includes fields the number of which corresponds to that of learning conditions. Each field stores the influence degree calculated by using the predictor 122 corresponding to the learning condition. The influence score 503 is a field for storing an integrated influence score calculated from the influence degree of the learning data calculated by use of the predictor 122 of each learning condition.

Figure 6:
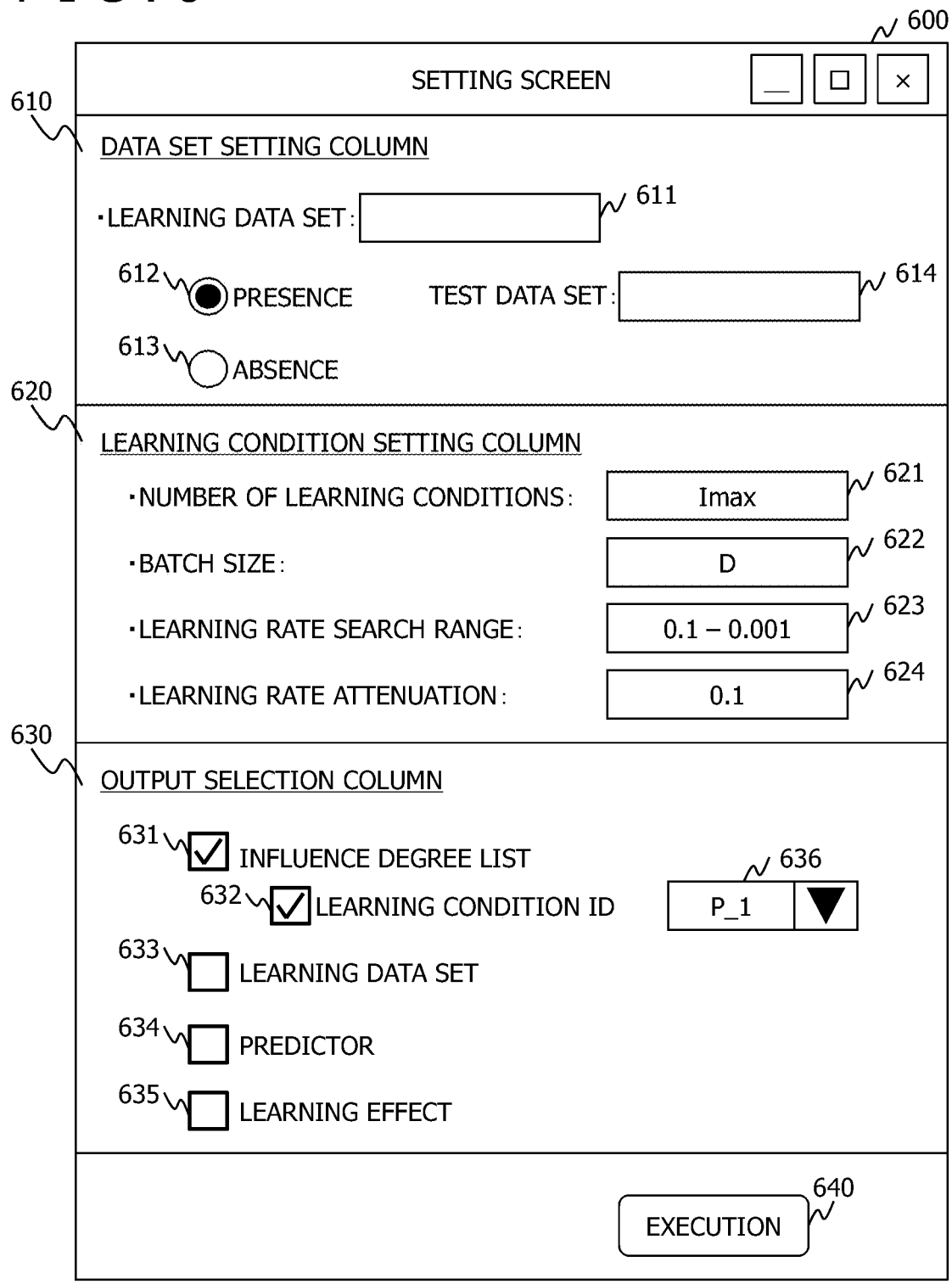
FIG. 6 is a diagram depicting an example of a user interface (UI) provided by a data acceptance unit of the first embodiment.

FIG. 6 and FIG. 7 are diagrams each depicting an example of a UI provided by the data acceptance unit 110 of the first embodiment.

A GUI 600 depicted in FIG. 6 is a UI provided by the data acceptance unit 110 and is displayed on the output device of the terminal 101. The GUI 600 includes a data set setting column 610, a learning condition setting column 620, an output selection column 630, and an execution button 640.

The data set setting column 610 is a column for setting information (data set setting information) relating to the learning data set and the test data set. The data set setting column 610 includes a learning data set setting column 611, a radio button 612, a radio button 613, and a test data set setting column 614.

The learning data set setting column 611 is a column for setting a default learning data set. In the learning data set setting column 611, a path or the like indicating the storage location of the learning data database 124 is set.

The radio button 612 is selected in a case where a test data set is input. The radio button 613 is selected in a case where a test data set is not input. The test data set setting column 614 is a column for setting a test data set to be input. In the test data set setting column 614, a path indicating the storage location of the test data set, a file corresponding to the test data set, or the like is set. In a case where the radio button 612 is operated, input to the test data set setting column 614 is validated.

The learning condition setting column 620 is a column for setting information (learning condition setting information) relating to the learning condition. The learning condition setting column 620 includes a learning condition number setting column 621, a batch size setting column 622, a learning rate search range 623, and a learning rate attenuation 624.

The learning condition number setting column 621 is a column for setting the maximum number of learning conditions to be generated. The batch size setting column 622 is a column for setting the number of learning data to be included in the batch, that is, the batch size. The learning rate search range 623 is a column for setting the range of the learning rate. The learning rate attenuation 624 is a column for setting the width of the attenuation of the learning rate.

The output selection column 630 is a column for selecting information to be output. The output selection column 630 includes check boxes 631, 632, 633, 634, and 635 and a learning condition ID setting column 636.

The check box 631 is selected in a case where information relating to the influence score and the influence degree is output. The check box 632 is selected in a case where information relating to the influence degree of a specific learning condition is output. The learning condition ID setting column 636 is a column for setting the identification information of the learning condition. In a case where the check box 631 is operated, input to the check box 632 and the learning condition ID setting column 636 is validated.

The check box 633 is selected in a case where a learning data set including the learning data selected on the basis of the influence degree is output. The check box 634 is selected in a case where the predictor 122 generated by using the learning data set including the learning data selected on the basis of the influence score is output. The check box 635 is selected in a case where a learning effect indicating a relation between a threshold value used when selecting learning data on the basis of the influence score and the prediction accuracy is output.

In the following description, a request corresponding to the check box 631 is described as an influence degree output request, a request corresponding to the check box 633 is described as a learning data set output request, a request corresponding to the check box 634 is described as a predictor output request, and a request corresponding to the check box 635 is described as a learning effect output request. It should be noted that, in a case where the check box 632 is operated, the influence degree output request includes the identification information of the learning condition.

The execution button 640 is an operation button for instructing execution of processing. In a case where a user operates the execution button 640, an execution request including information set in each of the data set setting column 610, the learning condition setting column 620, and the output selection column 630 is transmitted to the data acceptance unit 110. In a case where the execution request is received, the data acceptance unit 110 transmits a learning instruction to the computer 100-2, and transmits a learning data selection instruction to the computer 100-3 after receiving a response from the computer 100-2.

The learning instruction includes the data set setting information and the learning condition setting information. The learning data selection instruction includes a request corresponding to the operation of the output selection column 630.

An API 700 depicted in FIG. 7 is a UI provided by the data acceptance unit 110.

The user inputs a command to the API 700 to set learning data, test data, learning conditions, and information to be output.

Figure 8:
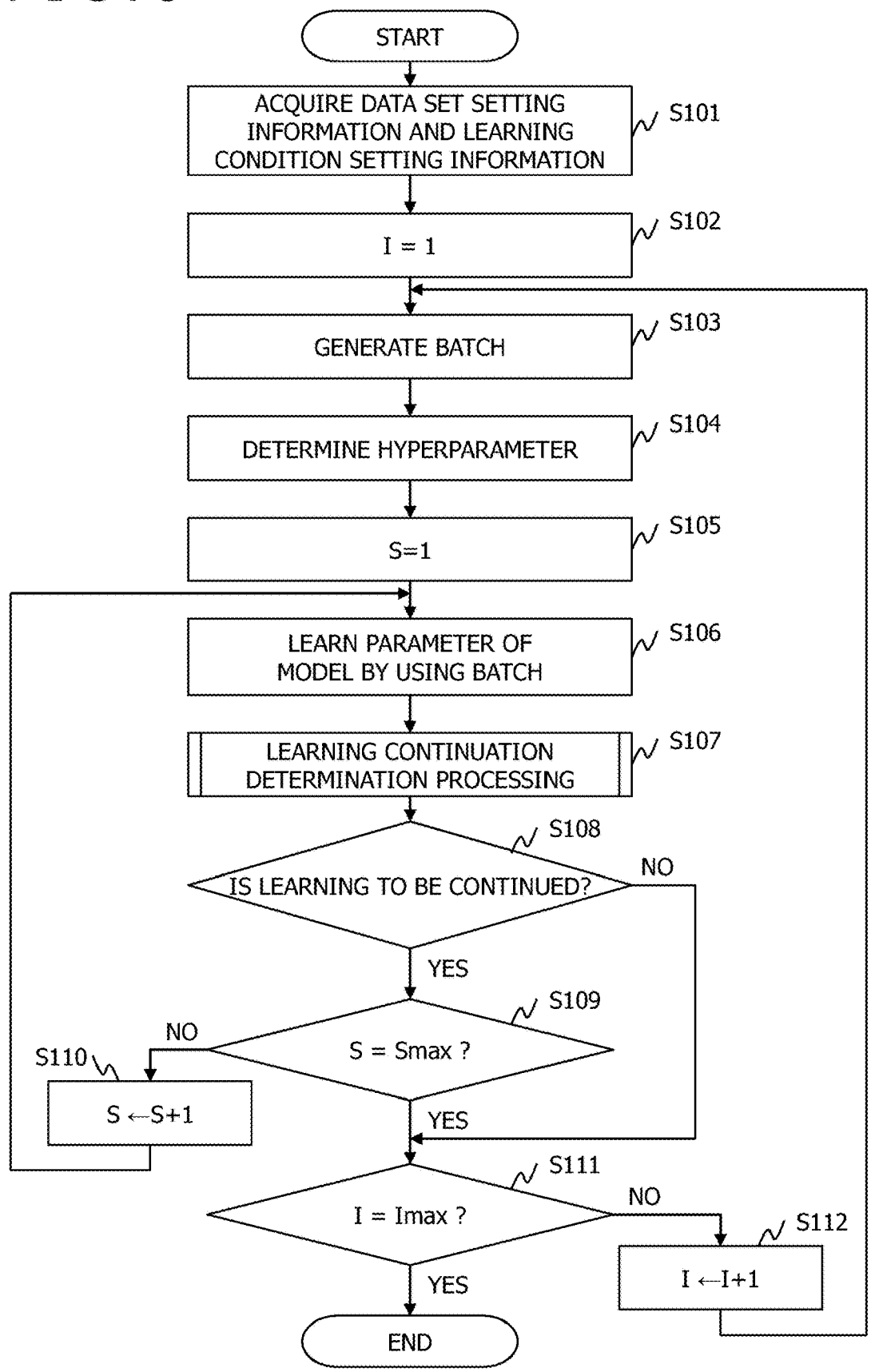
FIG. 8 is a flowchart describing processing executed by the computer of the first embodiment.

FIG. 8 is a flowchart for describing processing executed by the computer 100-2 of the first embodiment.

In a case where the computer 100-2 receives the learning instruction from the computer 100-1 that has accepted the execution request, the computer 100-2 executes the processing described below.

The learning condition setting unit 120 acquires the data set setting information and the learning condition setting information included in the learning instruction (Step S101). At this time, the learning condition setting unit 120 sets the maximum number Imax of learning conditions to be generated and the number of batches Smax. It should be noted that the number of batches may be given as an external input or may be automatically calculated from the batch size and the number of learning data stored in the learning data database 124.

The learning condition setting unit 120 initializes a variable I (Step S102). The variable I is a variable indicating the identification number of the learning condition.

The learning condition setting unit 120 generates a plurality of batches by using the learning data stored in the learning data database 124 (Step S103).

Specifically, the learning condition setting unit 120 randomly selects a predetermined number of learning data from the learning data database 124 on the basis of the batch size included in the learning condition setting information and the data set setting information, and determines the input order of the plurality of pieces of learning data to generate Smax batches.

At this time, the learning condition setting unit 120 adds an entry to the learning history information 123 and sets identification information corresponding to the variable I to the learning condition ID 301 of the entry. For example, in a case where the variable I is 3, identification information "P_3" is set to the learning condition ID 301. The learning condition setting unit 120 sets the learning data included in the batch to each field of the learning order 302 of the added entry in the input order.

The learning condition setting unit 120 determines a hyperparameter such as a learning rate on the basis of the learning condition setting information (Step S104).

In the present embodiment, the learning condition setting unit 120 determines a learning rate and an attenuation width. At this time, the learning condition setting unit 120 sets the determined hyperparameter to the hyperparameter 303 of the entry added to the learning history information 123. In addition, the learning condition setting unit 120 outputs the learning instruction including the identification information of the learning condition to the learning unit 121.

The learning unit 121 initializes a variable S (Step S105). The variable S is a variable indicating the identification number of the batch.

The learning unit 121 learns the parameter of the predictor 122 by using the learning data included in the batch corresponding to the variable S (Step S106).

Specifically, the learning unit 121 refers to the learning history information 123, searches for an entry corresponding to the identification information of the learning condition included in the learning instruction, and executes learning processing on the basis of the batch corresponding to the variable S of the learning order 302 of the entry and the hyperparameter 303 of the entry. In the present embodiment, the learning is performed according to the input order. In addition, the learning unit 121 sets the value of the parameter of the predictor 122 and the prediction accuracy to the field corresponding to the variable S of the learning result 304 of the entry corresponding to the identification information of the learning condition.

The learning unit 121 executes learning continuation determination processing (Step S107), and determines whether or not to continue the learning on the basis of the result of the processing (Step S108).

In a case where it is determined that the learning is not to be continued, the learning unit 121 outputs a response indicating to stop the learning to the learning condition setting unit 120. In a case where the response is received, the learning condition setting unit 120 proceeds to Step S111.

In the present embodiment, in a case where a state in which the calculation of the influence degree cannot be expected is detected, the computer 100-2 terminates the learning of the current learning condition.

In a case where it is determined that the learning is to be continued, the learning unit 121 outputs a response indicating to continue the learning to the learning condition setting unit 120. In a case where the response is received, the learning condition setting unit 120 determines whether or not the value of the variable S matches Smax (Step S109). That is, it is determined whether or not the processing has been completed for all the batches.

In a case where it is determined that the value of the variable S does not match Smax, the learning condition setting unit 120 sets a value obtained by adding 1 to the variable S to the variable S (Step S110), and then returns to Step S106. In this case, similar processing is executed by use of another batch.

In a case where it is determined that the value of the variable S matches Smax, the learning condition setting unit 120 proceeds to Step S111.

In Step S111, the learning condition setting unit 120 determines whether or not the value of the variable I matches Imax (Step S111). That is, it is determined whether or not the value has reached the maximum number of learning conditions.

In a case where it is determined that the value of the variable I does not match Imax, the learning condition setting unit 120 sets a value obtained by adding 1 to the variable I to the variable I (Step S112), and then returns to Step S103. In this case, a new learning condition is set, and similar processing is executed under the new learning condition.

In a case where it is determined that the value of the variable I matches Imax, the learning condition setting unit 120 terminates the processing. At this time, the learning condition setting unit 120 transmits a response indicating the completion of the processing to the data acceptance unit 110.

Figure 9:
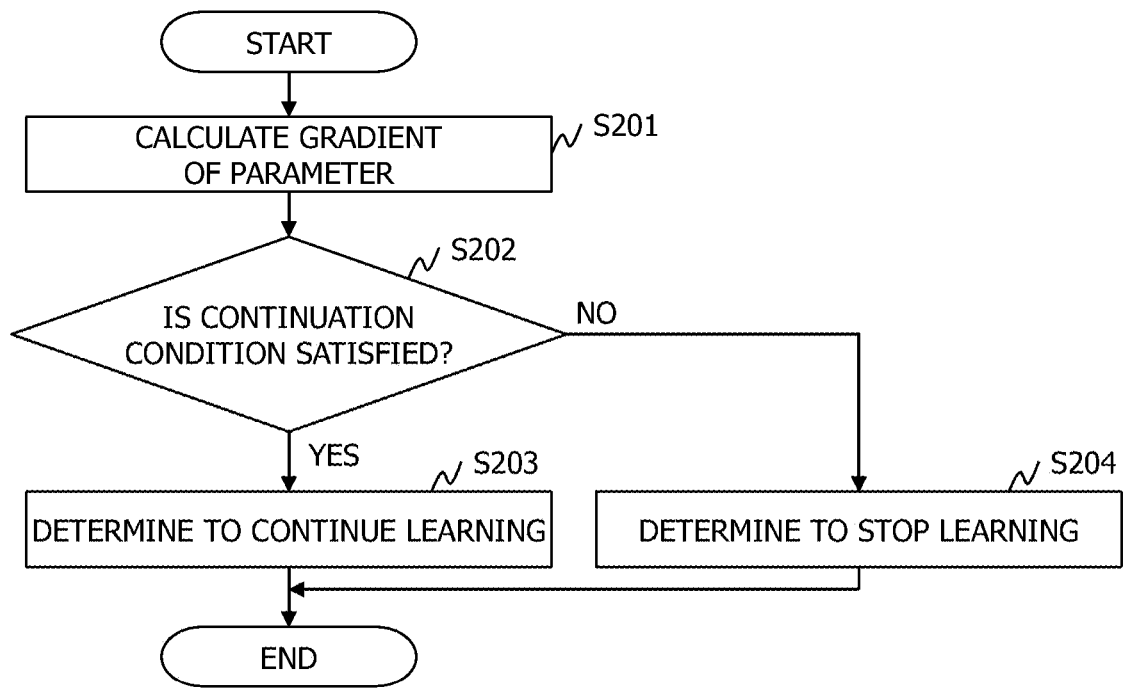
FIG. 9 is a flowchart describing learning continuation determination processing executed by the computer of the first embodiment.

FIG. 9 is a flowchart for describing the learning continuation determination processing executed by the computer 100-2 of the first embodiment.

The learning unit 121 calculates the gradient of the parameter of the predictor 122 (Step S201). Since the method of calculating the gradient of the parameter is a known technique, the detailed explanation thereof will be omitted.

The learning unit 121 determines whether or not the continuation condition is satisfied on the basis of the gradient of the parameter (Step S202).

For example, the learning unit 121 determines whether or not the gradient of the parameter is 0 or the gradient of the parameter is larger than a threshold value. In a case where the gradient of the parameter is 0 or the gradient of the parameter is larger than the threshold value, it is determined that the continuation condition is not satisfied.

In a case where it is determined that the continuation condition is satisfied, the learning unit 121 determines to continue the learning (Step S203), and then terminates the learning continuation determination processing.

In a case where it is determined that the continuation condition is not satisfied, the learning unit 121 determines to stop the learning (Step S204), and then terminates the learning continuation determination processing.

Figure 10:
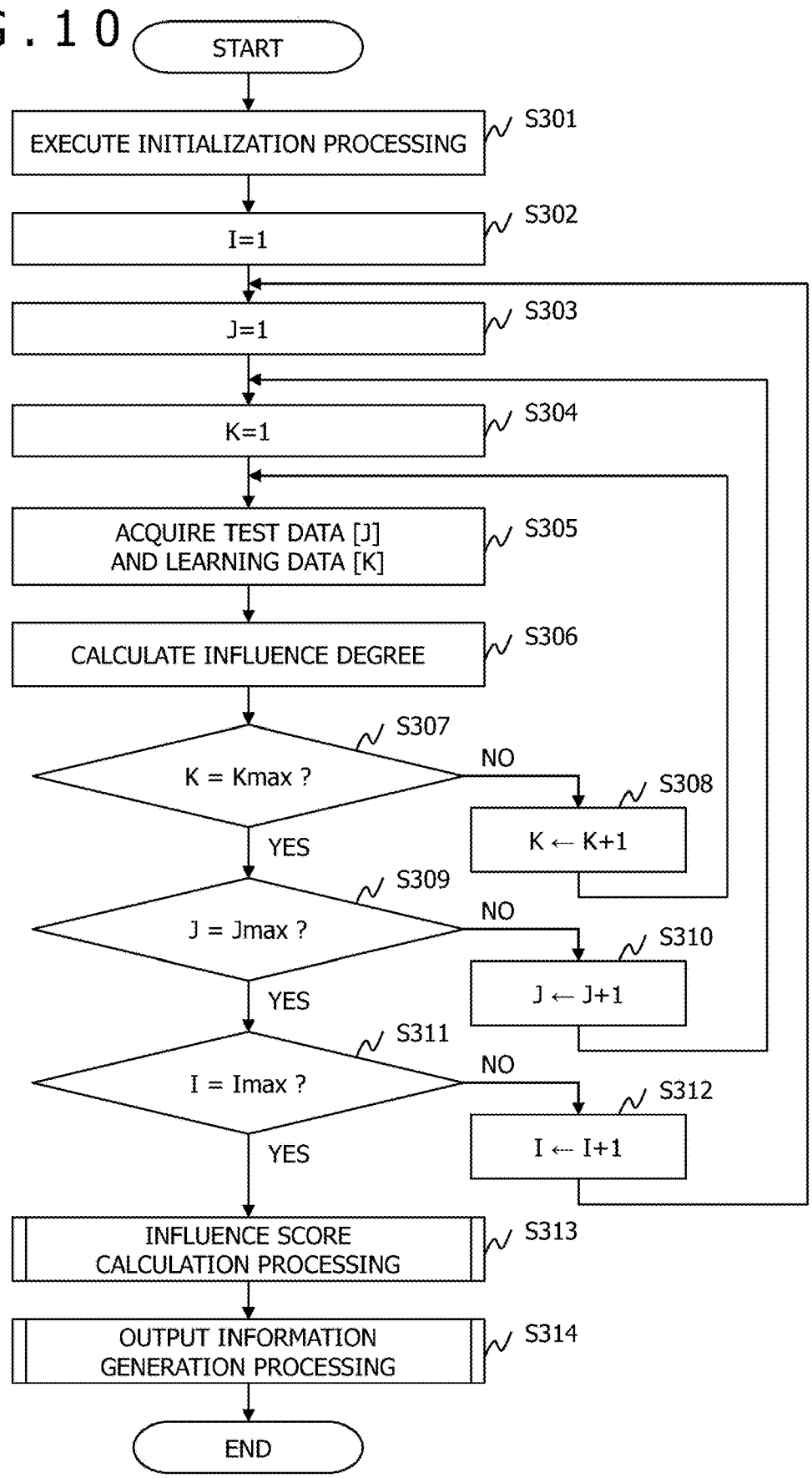
FIG. 10 is a flowchart describing processing executed by the computer of the first embodiment.

FIG. 10 is a flowchart for describing processing executed by the computer 100-3 of the first embodiment.

In a case where the computer 100-3 receives the learning data selection instruction from the computer 100-1 that has accepted the execution request, the computer 100-3 executes the processing described below.

The influence score calculation unit 130 executes initialization processing (Step S301). Specifically, the following processing is executed.

(S301-1) The influence score calculation unit 130 acquires a plurality of pieces of learning data from the learning data database 124.

In a case where operation information of the radio button 612 of the data set setting column 610 is included in the learning data selection instruction, the influence score calculation unit 130 generates a learning data set from the plurality of pieces of acquired learning data and acquires a test data set included in the learning data selection instruction. The influence score calculation unit 130 gives an identification number to data included in each data set.

In a case where operation information of the radio button 613 of the data set setting column 610 is included in the learning data selection instruction, the influence score calculation unit 130 selects a predetermined number of learning data as test data among the plurality of pieces of acquired learning data. The influence score calculation unit 130 generates a learning data set from a plurality of pieces of learning data excluding the learning data selected as the test data, and generates a test data set from a predetermined number of test data. The influence score calculation unit 130 gives an identification number to data included in each data set.

It should be noted that the present embodiment is not limited to the method of selecting the test data from the learning data database 124. For example, the influence score calculation unit 130 randomly selects the test data. It should be noted that the number of test data can be optionally set. The number can be updated at an optional timing.

(S301-2) The influence score calculation unit 130 initializes the influence degree information 132 and the influence score information 133.

The above is the description of the processing of Step S301.

Next, the influence score calculation unit 130 initializes the variable I (Step S302), a variable J (Step S303), and a variable K (Step S304). The variable I is a variable indicating the identification number of the learning condition, the variable J is a variable indicating the identification number of the test data, and the variable K is a variable indicating the identification number of the learning data.

Specifically, the influence score calculation unit 130 sets 1 to each of the variable I, variable J, and variable K.

In Step S302, the influence score calculation unit 130 sets the maximum number of learning conditions to be generated to Imax, and adds the two-dimensional array 400 corresponding to the variable I to the influence degree information 132. In addition, the influence score calculation unit 130 accesses the learning history information 123 to acquire the value of the parameter defining the predictor 122 from the learning results 304 of the entries corresponding to the variable I. Here, it is assumed that the value of the parameter having the highest prediction accuracy among the learning results 304 of the entries corresponding to the learning condition I is acquired. In Step S303, the influence score calculation unit 130 sets the number of test data included in the test data set to Jmax, and sets the number of learning data included in the learning data set to Kmax in Step S304.

Next, the influence score calculation unit 130 acquires the test data corresponding to the variable J from the test data set and acquires the learning data corresponding to the variable K from the learning data set (Step S305).

Next, the influence score calculation unit 130 calculates the influence degree by using the predictor 122 corresponding to the test data (J), the learning data (K), and the learning condition (I) (Step S306), and sets the calculated influence degree to the cell corresponding to the K-th row and the J-th column of the two-dimensional array 400 corresponding to the variable I. It should be noted that, since the calculation method of the influence degree is described in Non-Patent Document 1, the detailed explanation thereof will be omitted.

Next, the influence score calculation unit 130 determines whether or not the value of the variable K matches Kmax (Step S307). That is, it is determined whether or not the processing has been completed for all the learning data.

In a case where it is determined that the value of the variable K does not match Kmax, the influence score calculation unit 130 sets a value obtained by adding 1 to the variable K to the variable K (Step S308), and then returns to Step S305.

In a case where it is determined that the value of the variable K matches Kmax, the influence score calculation unit 130 determines whether or not the value of the variable J matches Jmax (Step S309). That is, it is determined whether or not the processing has been completed for all the test data.

In a case where it is determined that the value of the variable J does not match Jmax, the influence score calculation unit 130 sets a value obtained by adding 1 to the variable J to the variable J (Step S310), and then returns to Step S304.

In a case where it is determined that the value of the variable J matches Jmax, the influence score calculation unit 130 determines whether or not the value of the variable I matches Imax (Step S311). That is, it is determined whether or not a new learning condition is to be generated.

In a case where it is determined that the value of the variable I does not match Imax, the influence score calculation unit 130 sets a value obtained by adding 1 to the variable I to the variable I (Step S312), and then returns to Step S303.

In a case where it is determined that the value of the variable I matches Imax, the influence score calculation unit 130 executes influence score calculation processing (Step S313). The details of the influence score calculation processing will be described with reference to FIG. 11.

Next, the influence score calculation unit 130 executes output information generation processing (Step S314). Thereafter, the influence score calculation unit 130 terminates the processing. The details of the output information generation processing will be described with reference to FIG. 12A and FIG. 12B.

It should be noted that a plurality of pieces of test data may be selected for one learning data to calculate the influence degree. That is, Step S303 may be replaced with Step S304, and Step S307 and Step S308 may be replaced with Step S309 and Step S310.

Figure 11:
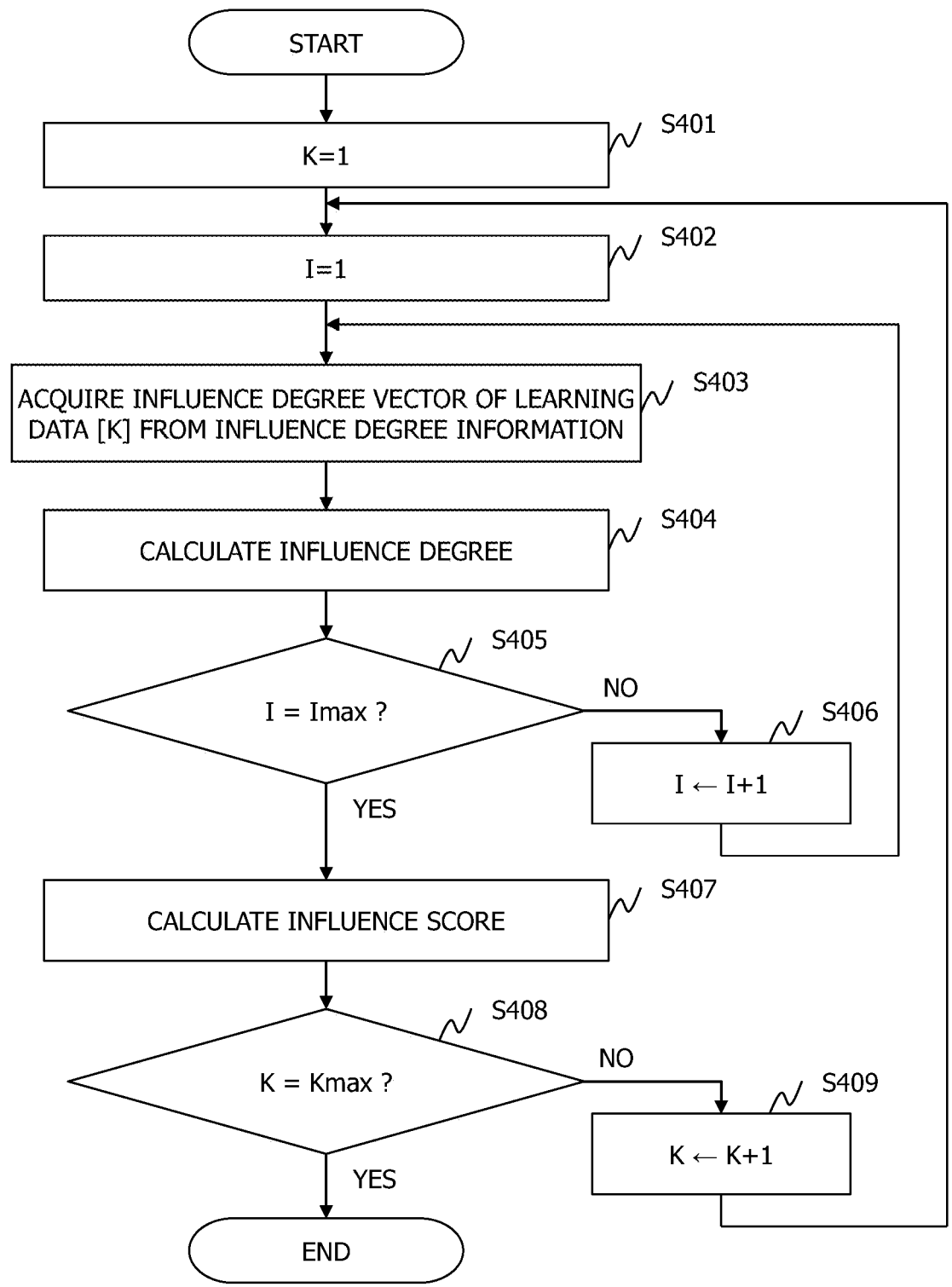
FIG. 11 is a flowchart describing influence score calculation processing executed by the computer of the first embodiment.

FIG. 11 is a flowchart for describing the influence score calculation processing executed by the computer 100-3 of the first embodiment.

The influence score calculation unit 130 initializes the variable K (Step S401).

Specifically, the influence score calculation unit 130 sets 1 to the variable K, and sets the number of learning data included in the learning data set to Kmax. In addition, the influence score calculation unit 130 adds an entry to the influence score information 133, and sets the identification information of the learning data to the learning data ID 501.

The influence score calculation unit 130 initializes the variable I (Step S402).

Specifically, the influence score calculation unit 130 sets 1 to the variable I.

Next, the influence score calculation unit 130 acquires the K-th row of the two-dimensional array 400 corresponding to the variable I of the influence degree information 132 as an influence degree vector of the learning data (Step S403).

Next, the influence score calculation unit 130 calculates the influence score of the learning data by use of the influence degree vector of the learning data, and registers the same in the influence score information 133 (Step S404).

The present embodiment is not limited to the calculation method of the influence score. For example, the influence score calculation unit 130 calculates the total value or average value of respective components of the influence degree vector as an influence score. In addition, the influence score calculation unit 130 calculates the inner product of any coefficient vector and the influence degree vector as an influence score.

The influence score calculation unit 130 refers to the influence score information 133 to search for an entry corresponding to the variable K, and sets the calculated influence score to the field corresponding to the variable I of the influence degree 502 of the entry.

Next, the influence score calculation unit 130 determines whether or not the value of the variable I matches Imax (Step S405). That is, it is determined whether or not the processing has been completed for all the learning conditions.

In a case where it is determined that the value of the variable I does not match Imax, the influence score calculation unit 130 sets a value obtained by adding 1 to the variable I to the variable I (Step S406), and then returns to Step S403.

In a case where it is determined that the value of the variable I matches Imax, the influence score calculation unit 130 calculates an influence score (Step S407), and registers the same in the influence score information 133.

Specifically, the influence score calculation unit 130 refers to the influence score information 133 to search for an entry corresponding to the variable K. The influence score calculation unit 130 calculates the influence score by use of a plurality of influences stored in the influence degree 502 of the searched entry. For example, a method of calculating the average value of the influence scores, the weighted average of the influence scores, and the like as the influence score is conceivable. A method of determining the weight on the basis of the prediction accuracy of the predictor 122 is conceivable.

The influence score calculation unit 130 sets the calculated influence score to the influence score 503 of the entry.

Next, the influence score calculation unit 130 determines whether or not the value of the variable K matches Kmax (Step S408). That is, it is determined whether or not the processing has been completed for all the learning data.

In a case where it is determined that the value of the variable K does not match Kmax, the influence score calculation unit 130 sets a value obtained by adding 1 to the variable K to the variable K (Step S409), and then returns to Step S402. At this time, the influence score calculation unit 130 adds an entry to the influence score information 133, and sets the identification information of the learning data to the learning data ID 501.

In a case where it is determined that the value of the variable K matches Kmax, the influence score calculation unit 130 terminates the influence score calculation processing.

Figure 12A:
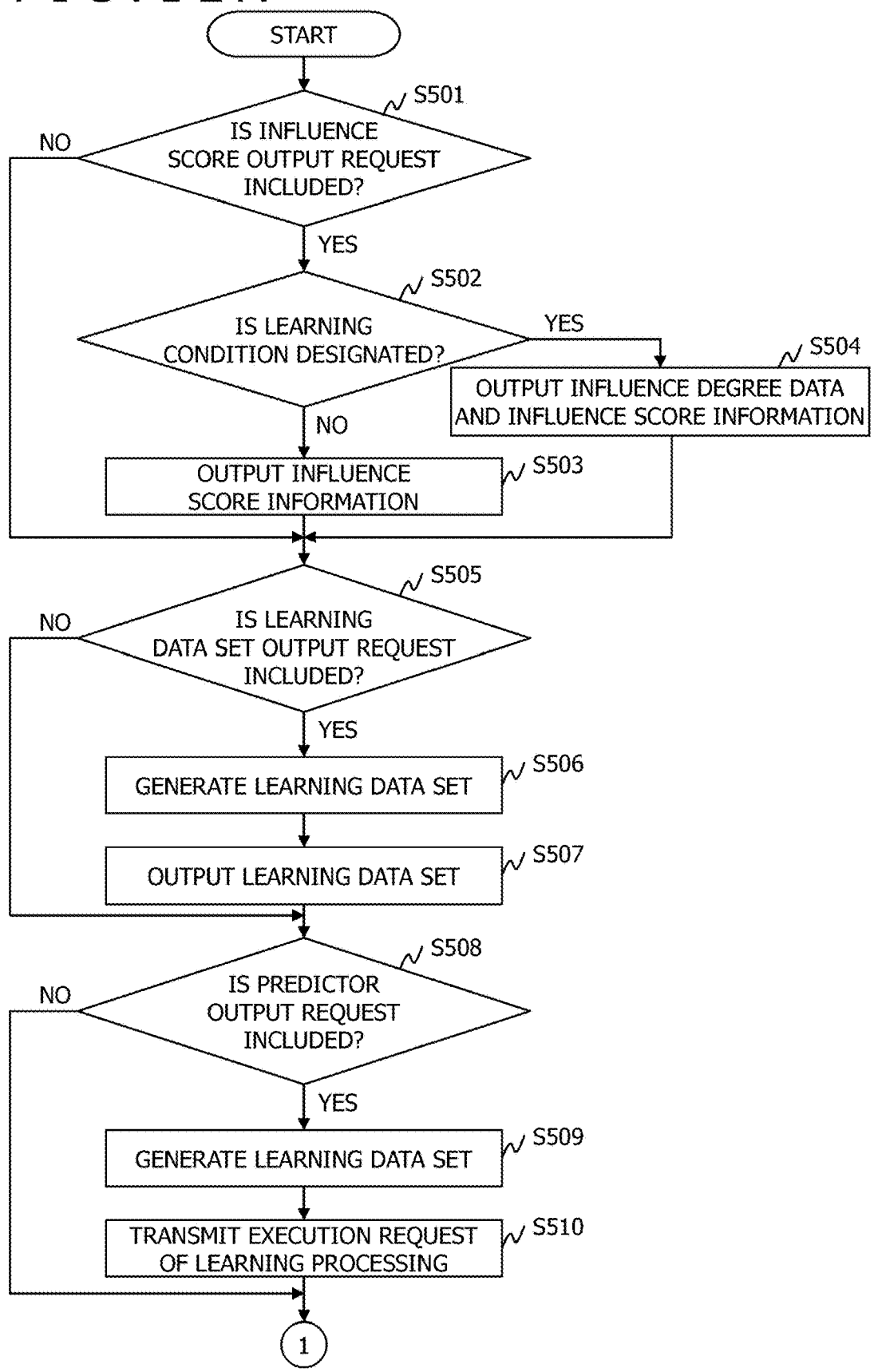
FIG. 12A is a flowchart describing output information generation processing executed by the computer of the first embodiment.
Figure 14:
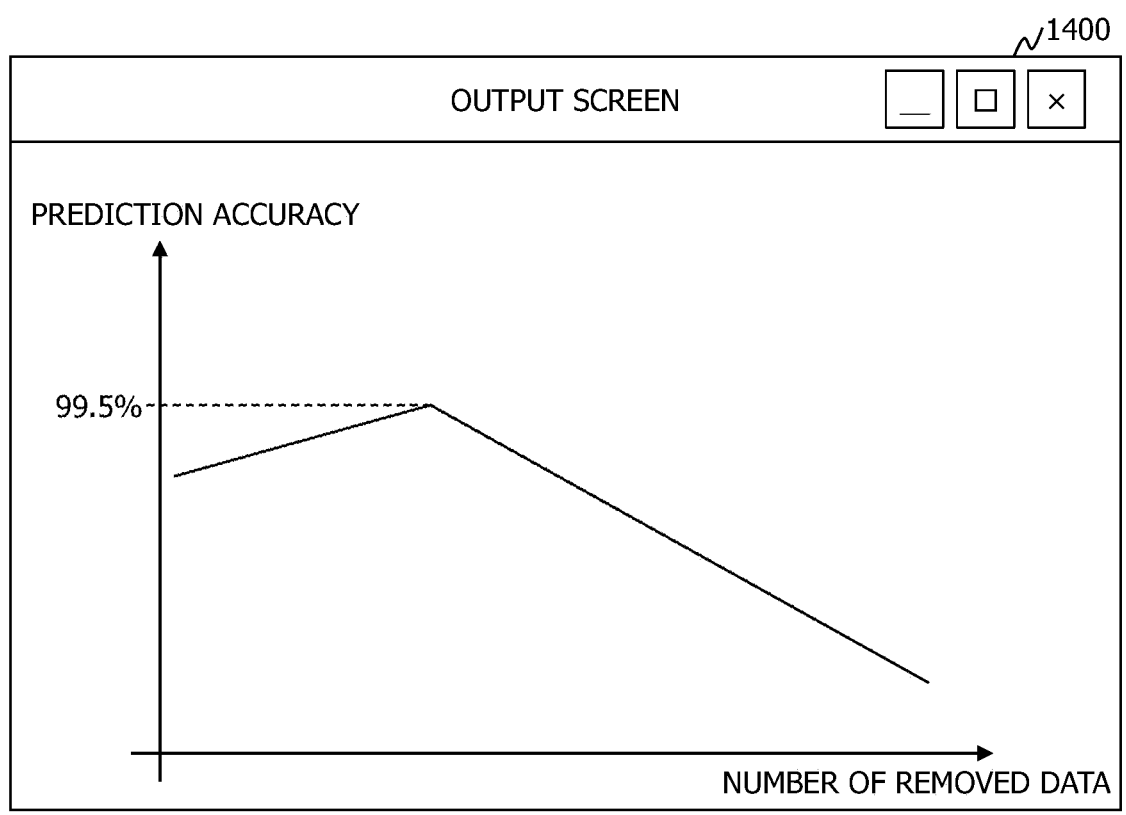
FIG. 14 is a diagram depicting an example of information output by the computer of the first embodiment.

FIG. 12A and FIG. 12B are flowcharts each describing the output information generation processing executed by the computer 100-3 of the first embodiment. FIG. 13 and FIG. 14 are diagrams each depicting an example of information output by the computer 100-3 of the first embodiment.

The influence score calculation unit 130 determines whether or not the influence score output request is included in the learning data selection instruction (Step S501).

In a case where it is determined that the influence score output request is not included in the learning data selection instruction, the influence score calculation unit 130 proceeds to Step S505.

In a case where it is determined that the influence score output request is included in the learning data selection instruction, the influence score calculation unit 130 determines whether or not a learning condition is designated (Step S502).

Specifically, the influence score calculation unit 130 determines whether or not the identification information of the learning condition is included in the influence score output request. In a case where the identification information of the learning condition is included in the influence score output request, the influence score calculation unit 130 determines that the learning condition is designated.

In a case where it is determined that the learning condition is not designated, the influence score calculation unit 130 outputs the influence score information 133 via the computer 100-1 (Step S503). Thereafter, the influence score calculation unit 130 proceeds to Step S505.

In this case, the result output unit 111 of the computer 100-1 generates display information for displaying the influence score information 133, and transmits the display information to the terminal 101.

In a case where it is determined that the learning condition is designated, the influence score calculation unit 130 outputs influence degree data and the influence score information 133 via the computer 100-1 (Step S504). Thereafter, the influence score calculation unit 130 proceeds to Step S505.

Here, the influence degree data is the two-dimensional array 400 corresponding to the designated learning condition.

In this case, the result output unit 111 of the computer 100-1 generates display information for displaying the influence degree data and the influence score information 133, and transmits the display information to the terminal 101. An output screen 1300 as depicted in FIG. 13 is displayed on the terminal 101.

By presenting the influence degree data as depicted in FIG. 13 to the user, the user can easily select the learning data according to the characteristics of the input data. In addition, the user can easily determine whether or not it is necessary to add learning data for improving the prediction accuracy of the predictor 122 for the test data.

In Step S505, the influence score calculation unit 130 determines whether or not the learning data set output request is included in the learning data selection instruction (Step S505).

In a case where it is determined that the learning data set output request is not included in the learning data selection instruction, the influence score calculation unit 130 proceeds to Step S508.

In a case where it is determined that the learning data set output request is included in the learning data selection instruction, the influence score calculation unit 130 instructs the learning data selection unit 131 to generate a learning data set (Step S506).

In a case where the instruction is accepted from the influence score calculation unit 130, the learning data selection unit 131 selects learning data on the basis of the influence score information 133. For example, the following selection method is conceivable.

(Selection method 1) The learning data selection unit 131 selects a learning condition, refers to a column corresponding to the learning condition of the influence degree 502, and selects n pieces of learning data in descending order of the influence score. The learning data selection unit 131 executes the similar processing for all the learning conditions. The learning data selection unit 131 generates a learning data set by excluding the selected learning data from the learning data database 124. However, it is assumed that a variable n is preliminarily set. However, the variable n can be updated at an optional timing.

(Selection Method 2)

The learning data selection unit 131 selects a learning condition, refers to a column corresponding to the learning condition of the influence degree 502, and selects learning data whose influence score is smaller than a first threshold value. The learning data selection unit 131 executes the similar processing for all the learning conditions. The learning data selection unit 131 counts the number of times the influence score becomes smaller than the first threshold value for each learning data on the basis of the processing result described above. The learning data selection unit 131 generates a learning data set by excluding learning data for which the number of times is larger than a second threshold value from the learning data database 124. It should be noted that it is assumed that the first threshold value and the second threshold value are preliminarily set. However, the first threshold value and the second threshold value can be updated at an optional timing.

(Selection Method 3)

The learning data selection unit 131 generates a learning data set by excluding learning data whose influence score is smaller than a threshold value from the learning data database 124. It should be noted that it is assumed that the threshold value is preliminarily set. However, the threshold value can be updated at an optional timing.

It should be noted that the influence score corrected by using a weight set on the basis of the prediction accuracy may be used in the selection method 1 and the selection method 2. In the selection method 1 and the selection method 2, the determination may be based on the absolute value of the influence score. In the selection method 3, the determination may be based on the absolute value of the influence score.

Next, the influence score calculation unit 130 outputs the generated learning data set via the computer 100-1 (Step S507). Thereafter, the influence score calculation unit 130 proceeds to Step S508.

In Step S508, the influence score calculation unit 130 determines whether or not the predictor output request is included in the learning data selection instruction (Step S508).

In a case where it is determined that the predictor output request is not included in the learning data selection instruction, the influence score calculation unit 130 proceeds to Step S511.

In a case where it is determined that the predictor output request is included in the learning data selection instruction, the influence score calculation unit 130 instructs the learning data selection unit 131 to generate a learning data set (Step S509). The processing executed by the learning data selection unit 131 is the same as that described in Step S506.

Next, the influence score calculation unit 130 transmits an execution request of the learning processing together with the generated learning data set to the computer 100-2 (Step S510). Thereafter, the influence score calculation unit 130 proceeds to Step S511. It should be noted that the execution request may include the identification information of the selected learning data.

In a case where the execution request of the learning processing is received, the learning unit 121 of the computer 100-2 executes the learning processing of the predictor 122 by using the learning data set generated by the learning data selection unit 131. The learning unit 121 outputs the predictor 122 generated by the learning processing using the learning data set via the computer 100-1.

In Step S511, the influence score calculation unit 130 determines whether or not the learning effect output request is included in the learning data selection instruction (Step S511).

In a case where it is determined that the learning effect output request is not included in the learning data selection instruction, the influence score calculation unit 130 terminates the output information generation processing.

In a case where it is determined that the learning effect output request is included in the learning data selection instruction, the influence score calculation unit 130 initializes a threshold value used for generating a learning data set (Step S512).

For example, in the case of the selection method 1, the influence score calculation unit 130 sets a variable n to 1.

Next, the influence score calculation unit 130 instructs the learning data selection unit 131 to generate a learning data set (Step S513). The instruction includes information of a threshold value. The processing executed by the learning data selection unit 131 is the same as that described in Step S506.

Next, the influence score calculation unit 130 transmits an execution request of the learning processing together with the generated learning data set to the computer 100-2 (Step S514). It should be noted that the execution request may include the identification information of the selected learning data.

In a case where the execution request of the learning processing is received, the learning unit 121 of the computer 100-2 executes the learning processing of the predictor 122 by use of the learning data set generated by the learning data selection unit 131. The learning unit 121 transmits the prediction accuracy of the predictor 122 generated by the learning processing using the learning data set to the computer 100-3. The influence score calculation unit 130 records data in which the threshold value and the prediction accuracy are correlated with each other.

Next, the influence score calculation unit 130 determines whether or not to terminate the verification (Step S515). For example, the influence score calculation unit 130 determines whether or not the number of times of verification is larger than a threshold value. In a case where the number of times of verification is larger than the threshold value, the influence score calculation unit 130 determines to terminate the verification. It should be noted that it is assumed that the number of times of verification is preliminarily set. However, the number of times of verification can be updated at an optional timing.

In a case where it is determined that the verification is not to be terminated, the influence score calculation unit 130 updates the threshold value (Step S516), and then returns to Step S513.

In a case where it is determined that the verification is to be terminated, the influence score calculation unit 130 generates learning effect information indicating a relation between the threshold value and the prediction accuracy on the basis of the correlation data of the threshold value and the prediction accuracy, and outputs the learning effect information via the computer 100-1 (Step S517). Thereafter, the influence score calculation unit 130 terminates the output information generation processing.

For example, in the case of the selection method 1, an output screen 1400 for displaying a graph depicting a relation between the number n of removed data and the prediction accuracy is presented as depicted in FIG. 14.

It should be noted that the computer 100-3 may output the learning history information 123 in cooperation with the computer 100-2. The user transmits a reference request of the influence degree of an optional learning condition via the presented learning history information 123. In this case, the computer 100-3 outputs the two-dimensional array 400 of the designated learning condition.

According to the first embodiment, the computer 100-3 can efficiently and easily select the learning data for improving the prediction accuracy on the basis of the influence score. It is possible to depend on a specific learning condition by use of the influence scores using the predictor 122 generated under different learning conditions. The predictor 122 having high prediction accuracy can be provided to the user by generating the predictor 122 with the selected learning data.

It should be noted that the present invention is not limited to the above-described embodiment, but includes various modified examples. In addition, for example, the configurations of the above-described embodiment have been described in detail in order to clearly explain the present invention, and the embodiment is not necessarily limited to one having all the configurations described above. In addition, some configurations of each embodiment can be added to, deleted from, or replaced with other configurations.

In addition, some or all of the above-described configurations, functions, processing units, processing means, and the like may be realized by hardware by designing with, for example, integrated circuits. In addition, the present invention can also be realized by a program code of software for realizing the functions of the embodiment. In this case, a storage medium recording a program code is provided to a computer, and a processor provided in the computer reads the program code stored in the storage medium. In this case, the program code itself read from the storage medium realizes the functions of the above-described embodiment, and the program code itself and the storage medium storing the same configure the present invention. As a storage medium for supplying such a program code, for example, a flexible disk, a compact disc (CD)-read-only memory (ROM), a digital versatile disc (DVD)-ROM, a hard disk, an SSD, an optical disk, a magneto-optical disk, a CD-R, a magnetic tape, a nonvolatile memory card, a ROM, or the like is used.

In addition, the program code for realizing the functions described in the embodiment can be implemented in a wide range of programs or script languages such as, for example, assembler, C/C++, perl, Shell, PHP, Python, and Java (registered trademark).

Further, the program code of the software for realizing the functions of the embodiment may be distributed via a network and stored in storage means such as a hard disk or a memory of a computer or a storage medium such as a CD-RW or a CD-R, and a processor provided in the computer may read and execute the program code stored in the storage means or the storage medium.

In the above-described embodiment, the control lines and the information lines considered to be necessary in the explanation are indicated, but all the control lines and the information lines in the product are not necessarily depicted. All the configurations may be connected to each other.

What is claimed is:

1. A computer system for selecting training data that improves prediction accuracy of a machine learning model across varied learning conditions, the computer system comprising:
   a memory;
   a communication interface that is communicatively coupled to a database that stores (i) a plurality of pieces of learning data and ii information for managing a plurality of predictors generated under different learning conditions; and
   a processor that is communicatively coupled to the memory and the communication interface, wherein the processor is configured to:
   (a) select a target predictor from the plurality of predictors;
   (b) calculate, for each of a plurality of pieces of test data, an influence degree representing a strength of influence of each piece of the learning data on a prediction accuracy of the target predictor for a respective test data;
   (c) store, in association with each other, the target predictor and the influence degree of each piece of the learning data for each of the plurality of pieces of test data;
   (d) calculate, for each piece of the learning data and for each of the plurality of predictors, an influence score based on a plurality of the influence degrees associated with that piece of the learning data and the respective predictor;
   (e) store, in association with each other, each of the plurality of predictors and the influence score of each piece of the learning data;
   (f) generate a learning data set by selecting pieces of the learning data based on a plurality of influence scores associated with each respective piece of the learning data;
   (g) generate the plurality of predictors under the different learning conditions, wherein each learning condition includes (i) a subset of the plurality of pieces of learning data and (ii) an input order of the learning data in the subset, by:
      (i) generating a plurality of batches by selecting a predetermined number of pieces of learning data from the database and determining an input order for each batch;

(ii) selecting a target batch from the plurality of batches;

(iii) performing learning processing using the pieces of learning data in the target batch;

(iv) storing, in association with each other, the target batch, the input order of the pieces of learning data in the target batch, and the predictor generated based on the target batch;

(v) determining, based on a result of the learning processing, whether to continue the learning processing;

(vi) in response to determining that the learning processing is to continue, determining whether learning has been completed for all of the batches; and (vii) in response to determining that learning has not been completed for all of the batches, repeating steps (ii) through (v).

2. At least one non-transitory computer-readable storage medium storing instructions for generating a plurality of predictors, the instructions when executed by a processor, cause the processor to perform operations comprising:

(a) selecting a selected plurality of pieces of learning data from a plurality of pieces of learning data stored in at least one storage device;

(b) determining an input order of the selected plurality of pieces of learning data;

(c) generating a plurality of batches from the selected plurality of pieces of learning data by creating relation information between the batches and the selected plurality of pieces of learning data;

(d) creating a learning condition for the respective predictor, the learning condition including the input order determined and the relation information; and (e) training the respective predictor using the selected plurality of pieces of learning data and the corresponding learning condition;

(f) calculating an influence score for each piece of the learning data by:

(i) for each predictor, for each piece of test data, and for each piece of learning data, calculating a first influence degree representing a strength of influence of the each piece of learning data on a prediction accuracy of the predictor with respect to the test data;

(ii) for each predictor and each piece of learning data, calculating a second influence degree based on a plurality of the first influence degree; and (iii) calculating the influence score for each piece of learning data based on a plurality of the second influence degree; and (g) generating a learning data set comprising a plurality of pieces of learning data selected based on the influence scores.

3. The at least one non-transitory computer-readable storage medium according to claim 2, wherein each of the predictors is generated further by setting a hyperparameter for including a set hyperparameter into the learning condition.

4. The at least one non-transitory computer-readable storage medium according to claim 2, wherein the generate a learning data set is performed by:

excluding, from the learning data set, learning data having an influence score which is lower than a threshold.

5. The at least one non-transitory computer-readable storage medium according to claim 2, the operations further comprising:

training a predicator with the learning data set.

6. A computer system for selecting training data that improves prediction accuracy of a machine learning model across varied learning conditions, the computer system comprising:

at least one memory;

at least one communication interface that is communicatively coupled to to a database that stores (i) a plurality of pieces of learning data and (ii) information for managing a plurality of predictors generated under different learning conditions; and at least one processor that is communicatively coupled to the at least one memory and the at least one communication interface, wherein the at least one processor is configured to:

(a) select a selected plurality of pieces of learning data from a plurality of pieces of learning data stored in at least one storage device;

(b) determine an input order of the selected plurality of pieces of learning data;

(c) generate a plurality of batches from the selected plurality of pieces of learning data by creating relation information between the batches and the selected plurality of pieces of learning data;

(d) create a learning condition for the respective predictor, the learning condition including the input order determined and the relation information; and (e) train the respective predictor using the selected plurality of pieces of learning data and the corresponding learning condition;

(f) calculate an influence score for each piece of the learning data by:

(i) for each predictor, for each piece of test data, and for each piece of learning data, calculating a first influence degree representing a strength of influence of the each piece of learning data on a prediction accuracy of the predictor with respect to the test data;

(ii) for each predictor and each piece of learning data, calculating a second influence degree based on a plurality of the first influence degree; and (iii) calculating the influence score for each piece of learning data based on a plurality of the second influence degree; and (g) generate a learning data set comprising a plurality of pieces of learning data selected based on the influence scores.

7. The computer system according to claim 6, wherein each of the predictors is generated further by setting a hyperparameter for including a set hyperparameter into the learning condition.

8. The computer system according to claim 6, wherein the generate a learning data set is performed by:

excluding, from the learning data set, learning data having an influence score which is lower than a threshold.

9. The computer system according to claim 6, wherein the at least one processor is further configured to:

train a predicator with the learning data set.

* * * * *